US012663064B2

(12) United States Patent　　　　　(10) Patent No.:　US 12,663,064 B2

Tiziani　　　　　　　　　　　　　　　　(45) Date of Patent:　Jun. 23, 2026

(54) CLUTCH

(71) Applicant: Meritor Heavy Vehicle Systems Cameri S.p.A., Cameri (IT)

(72) Inventor: Eugenio Tiziani, Cameri (IT)

(73) Assignee: Meritor Heavy Vehicle Systems Cameri S.p.A. (IT)

( * ) Notice: Subject to any disclaimer, the term of this patent is extended or adjusted under 35 U.S.C. 154(b) by 0 days.

(21) Appl. No.: 19/238,866

(22) Filed: Jun. 16, 2025

(65) Prior Publication Data

US 2025/0383014 A1　Dec. 18, 2025

(30) Foreign Application Priority Data

Jun. 17, 2024　(EP) ..................................... 24182639

(51) Int. Cl.
　　　*F16H 48/24*　　　(2006.01)
　　　*F16H 48/32*　　　(2012.01)
(52) U.S. Cl.
　　　CPC ............. *F16H 48/32* (2013.01); *F16H 48/24* (2013.01)
(58) Field of Classification Search
　　　CPC ................................. F16H 48/32; F16H 48/24
　　　See application file for complete search history.

(56) References Cited

U.S. PATENT DOCUMENTS 10,724,622 B2 *　7/2020　Vuksa ............... F16H 57/02004
2019/0331173 A1 *　10/2019　Eschenburg ........... B60K 23/08

FOREIGN PATENT DOCUMENTS

GB　　　　1474518　　　5/1973
WO　　2016023083 A1　2/2016

OTHER PUBLICATIONS

Extended European Search Report for EP 24182639.5, Dated Nov. 25, 2024, 9 Pages.

* cited by examiner

*Primary Examiner* — Derek D Knight
(74) *Attorney, Agent, or Firm* — Dickinson Wright PLLC

(57)　　　　　　ABSTRACT

A clutch for a differential lock mechanism including a clutch collar configured to be disposed on a shaft extending in an axial direction so as to be movable along the axial direction. The clutch including a clutch collar actuator mechanism for actuating the clutch collar to move along the axial direction. The clutch collar actuator mechanism includes an actuator piston configured to be disposed around the shaft and to move along the axial direction of the shaft. The actuator piston is fixed relative to the clutch collar so as to move together with the clutch collar.

17 Claims, 5 Drawing Sheets

CLUTCH

CROSS-REFERENCE TO RELATED APPLICATIONS

This application claims priority to European Application No.: 24182639.5 filed on Jun. 17, 2024, the disclosure of which is hereby incorporated in its entirety by reference herein.

TECHNICAL FIELD

The present invention relates to a clutch. Aspects of the invention relate to a differential, in particular an inter-axle differential, comprising the clutch.

BACKGROUND

Conventionally, a clutch, e.g., for a differential lock mechanism of a differential, uses a shift fork to selectively axially move a clutch collar into and out of engagement with a gear of the differential to rotationally lock the gear to a shaft of the differential. The shift fork is actuated by an actuation mechanism arranged on an axis parallel to the shaft axis. A distance between the shaft axis and the axis of the actuation mechanism is bridged by the shift fork.

SUMMARY

Aspects and embodiments of the present disclosure provide a clutch and a differential, such as an inter-axle differential, comprising the clutch as described in the various embodiments set forth herein.

According to an aspect of the present disclosure, there is provided a clutch for a differential lock mechanism comprising a clutch collar configured to be disposed on a shaft extending in an axial direction so as to be movable along the axial direction, and a clutch collar actuator mechanism configured to actuate the clutch collar to move along the axial direction. The clutch collar actuator mechanism includes an actuator piston configured to be disposed around the shaft and to move along the axial direction of the shaft. The actuator piston is fixed relative to the clutch collar so as to move together with the clutch collar.

According to the above aspect, the clutch collar actuator mechanism is disposed around the shaft. This allows the actuator piston to act directly on the clutch collar, eliminating the need for a shift fork. As a result, a stiffer design can be achieved while reducing the number of components. In addition, the space required for the clutch collar actuator mechanism can be reduced, resulting in a simplified design of the carrier housing.

The clutch collar actuator mechanism can be pre-assembled and tested before the assembly. This makes it possible to prepare "certified kits" for the assembly line in advance, eliminating the need for subsequent functional testing.

Optionally, the clutch collar actuator mechanism may include a cover configured to be disposed around the shaft. The cover partially accommodates the actuator piston in a piston recess. The cover and the actuator piston form there between a pressure chamber configured to be pressurized and depressurized to move the piston back and forth.

Optionally, the clutch collar actuator mechanism may include a restoring arrangement to urge the actuator piston from an extended position to a retracted position.

Optionally, the restoring arrangement may include a preload member fixed to the cover and an elastic member interposed between the preload member and the actuator piston so as to urge the piston towards the cover.

Optionally, the clutch collar actuator mechanism may include a guiding arrangement to guide the movement of the actuator piston in the axial direction of the shaft axis.

Optionally, the guiding arrangement may include a guiding member fixed to the cover and a guiding hole formed in the actuator piston through which the guiding member penetrates in the axial direction.

Optionally, the actuator piston may circumferentially extend around the axial direction, and the cover circumferentially extends around the axial direction.

Optionally, the cover may include an inlet port and a communication path for connecting the inlet port and the pressure chamber for supplying pressurized fluid into the pressure chamber.

Optionally, a peripheral surface of the actuator piston may comprise a step having a surface facing the axial direction, a peripheral surface of the piston recess facing the peripheral surface of the actuator piston having the step may comprise a step having a surface facing the axial direction and opposed to the surface of the step of the actuator piston, and the pressure chamber may be interposed between the surface of the step of the actuator piston and the surface of the step of the piston recess.

Optionally, the actuator piston may be disposed around the clutch collar such that the actuator piston and the clutch collar at least partially overlaps in a radial direction.

Optionally, the cover may be disposed around the clutch collar such that the cover and the clutch collar at least partially overlaps in the radial direction.

Optionally, the actuator piston may include an engaging protrusion engaging with the clutch collar for coupling the actuator piston to the clutch collar.

Optionally, the engaging protrusion of the actuator piston may protrude from an inner peripheral surface towards a radial inner side.

Optionally, a plurality of engaging protrusions may be provided so as to be distributed at equal intervals around the circumference of the actuator piston, a plurality of guiding arrangements may be provided so as to be distributed at equal intervals around the circumference of the actuator piston, and the positions of engaging protrusions in the circumferential direction may correspond to the positions of the guiding arrangements.

As a result, the design can be simplified, the number of components can be reduced, and the installation space required can be reduced.

According to another aspect of the present disclosure, there is provided a differential, such as an inter-axle differential, comprising a shaft, a gear provided on the shaft so as to be rotatable on the shaft, and a differential lock mechanism comprising the clutch according to the above aspect, wherein the clutch collar is provided on the shaft so as to be rotationally fixed to the shaft and movable in the axial direction of the shaft, and the clutch is configured to selectively engage the clutch collar with the gear so that the gear is rotationally fixed to the shaft.

Within the scope of this application, it is expressly intended that the various aspects, embodiments, examples and alternatives set out in the preceding paragraphs, in the claims and/or in the following description and drawings, and, in particular, the individual features thereof, may be taken independently or in any combination. All embodiments and/or features of any embodiment can be combined in any way and/or combination unless such features are incompatible. The applicant reserves the right to change any originally filed claim or file any new claim accordingly, including the right to amend any originally filed claim to depend from and/or incorporate any feature of any other claim, although not originally claimed in that manner.

Further benefits and advantages of the present invention will become apparent from the following detailed description of at least one exemplary embodiment for carrying out the present invention with reference to the accompanying drawings.

BRIEF DESCRIPTION OF THE DRAWINGS

One or more embodiments of the invention will now be described, by way of example only, with reference to the accompanying drawings, in which.

DETAILED DESCRIPTION

Conventional arrangements of a clutch for a differential lock mechanism include a shift fork to selectively axially move a clutch collar into and out of engagement with a gear of the differential to rotationally lock the gear to a shaft of the differential. The shift fork is actuated by an actuation mechanism arranged on an axis parallel to the shaft axis and the distance between the shaft axis and the axis of the actuation mechanism is bridged by the shift fork.

The conventional arrangement has some drawbacks. The separately arranged actuation mechanism for the shift fork requires space and increases the complexity of a carrier housing accommodating the differential. In addition, problems may arise due to deflection of the shift fork due to the length of the shift fork bridging the distance between the shaft axis and the axis of the actuation mechanism. As an example, when the clutch is used for an inter-axle differential lock mechanism, the axis of the actuation mechanism has to be moved further away from the shaft axis due to the presence of the drive pinion, helical gears, etc. This results in an increase in the length of the shift fork. Thus, the risk of misalignment due to deflections of the shift fork is increased.

The present invention aims to address one or more of the disadvantages associated with the prior art.

An embodiment of the present invention is described below with reference to FIGS. 1 to 5.

Figure 1:
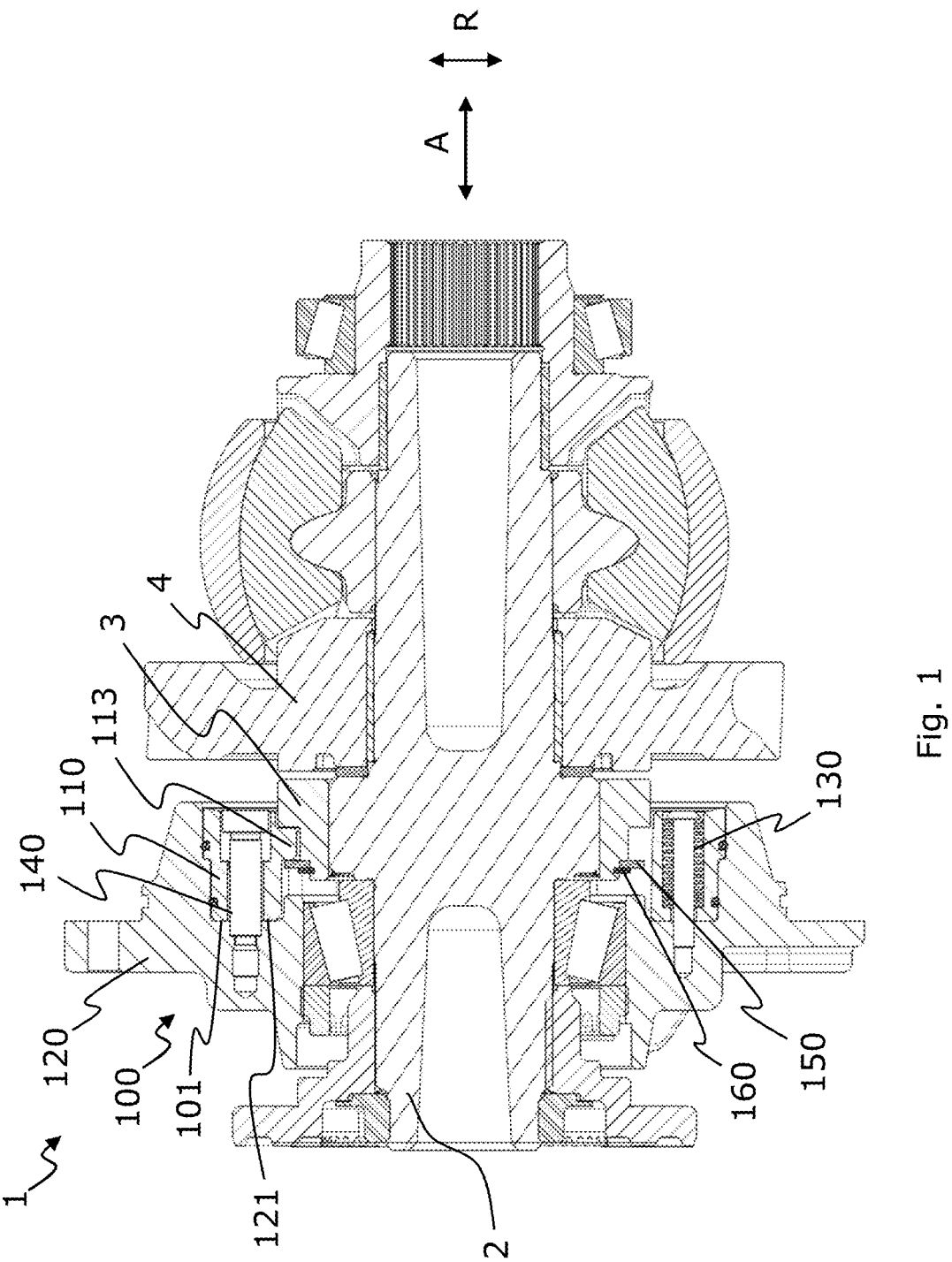
FIG. 1 is a schematic partial sectional view of an inter-axle differential comprising a clutch according to an embodiment of the present invention.
Figure 2:
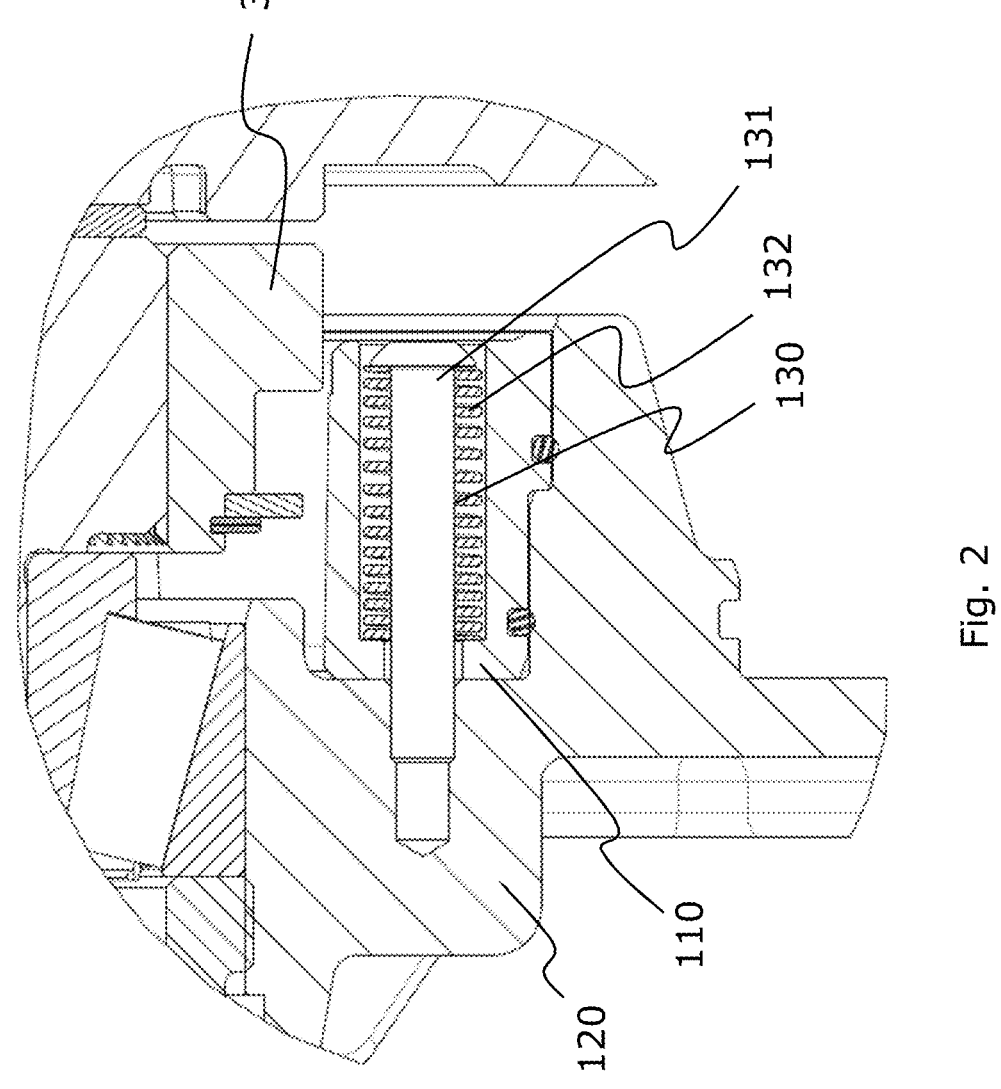
FIG. 2 is an enlarged partial view of FIG. 1.
Figure 3:
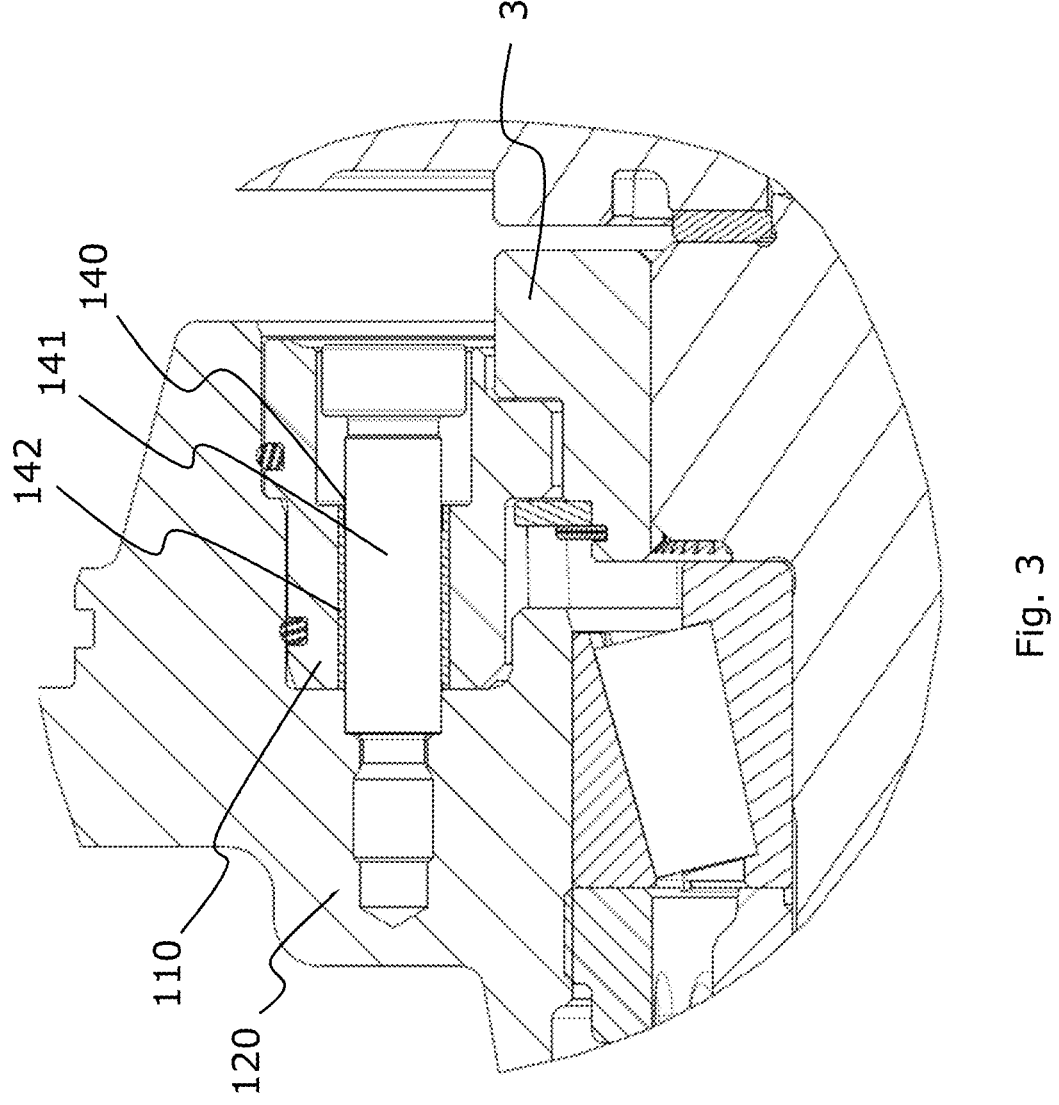
FIG. 3 is an enlarged partial view of FIG. 1.

FIG. 1 is a schematical sectional view of a clutch 1 installed to an inter-axle differential. The clutch 1 serves as an inter-axle differential locking clutch for locking the inter-axle differential. The inter-axle differential comprises a shaft 2 rotatably supported in a housing of the inter-axle differential. The shaft 2 is connectable to a prop shaft of a vehicle and serves as an input shaft.

The clutch 1 comprises a clutch collar 3 and a clutch collar actuator mechanism 100. The clutch collar 3 is slidably mounted on the shaft 2 by means of splines. That is, the clutch collar 3 is rotationally fixed to the shaft 2 but can be moved in the axial direction A of the shaft 2.

The clutch collar 3 is substantially formed as an annular member circumferentially surrounding the shaft 2. One end face in the axial direction is provided with a set of dog teeth. The set of dog teeth are provided for engaging with a corresponding opposed set of dog teeth provided on a gear 4 of the inter-axle differential rotatably supported on the shaft 2. By engaging the two sets of dog teeth, the gear 4 is rotationally fixed to the shaft 2 via the clutch collar 3, resulting in locking of the inter-axle differential.

The set of dog teeth of the clutch collar 3 can be engaged and disengaged with the set of dog teeth of the gear 4 by slidably moving the clutch collar 3 on the shaft 2 in the axial direction A. The axial movement of the clutch collar 3 is actuated by a clutch collar actuator mechanism 100, which is described below.

The outer peripheral surface of the clutch collar 3 is provided with a first step which increases the outer diameter and a second step which further increases the outer diameter of the clutch collar 3 when advancing in the axial direction A towards the end face provided with the set of dog teeth. An intermediate outer peripheral surface portion is interposed between the first and second steps. A spacer ring 150 abuts the first step and is secured by a retaining ring 160 so as to maintain contact with the first step. An outer diameter of the spacer ring 150 is larger than the outer diameter of the intermediate outer peripheral surface of the clutch collar 3. Thus, the spacer ring 150, the intermediate outer peripheral surface, and the second step define a groove extending in the circumferential direction.

The clutch collar actuator mechanism 100 comprises an actuator piston 110 and a cover 120. The actuator piston 110 is at least partially accommodated in the cover 120 so as to be movable in the axial direction A with respect to the cover 120. As described in more detail below, the actuator piston 110 is fixed relative to the clutch collar 3 so as to move together with the clutch collar 3.

The cover 120 is fixed to the housing of the inter-axle differential. In particular, the cover 120 may be formed as a part of the housing covering an axial opening of the housing.

The cover 120 is substantially formed as an annular member circumferentially surrounding the shaft 2. The cover 120 includes an axial hole through which the shaft 2 penetrates. The axial hole may accommodate a bearing for rotatably supporting the shaft 2.

The cover 120 includes a piston recess 121 for at least partially accommodating the actuator piston 110. The piston recess 121 is provided on an end face in the axial direction facing an interior of the housing. The piston recess 121 is recessed in the axial direction and extends in the circumferential direction so as to have a substantially annular shape. Thus, the piston recess 121 is formed by an outer wall portion forming a peripheral surface of the piston recess 121 positioned radially outwards, an inner wall portion forming a peripheral surface 122 of the piston recess 121 positioned radially inwards and a bottom surface facing the axial direction A.

In the embodiment shown in FIGS. 1 to 5, the piston recess 121 is coaxially disposed with respect to the axial direction A of the shaft 2. However, the present invention is not limited thereto. It is also possible to dispose the piston recess 121 not coaxially but eccentrically to the axial direction A. It is further noted that the annular shape of the piston recess 121 is not necessarily circular, but may be any other circumferential shape, such as oval, polygonal, etc.

In this embodiment, the bottom surface of the piston recess 121 is provided with several threaded holes that are evenly distributed around the entire circumference.

Figure 5:
FIG. 5 is a sectional view of the clutch of FIG. 1.
Figure 5:
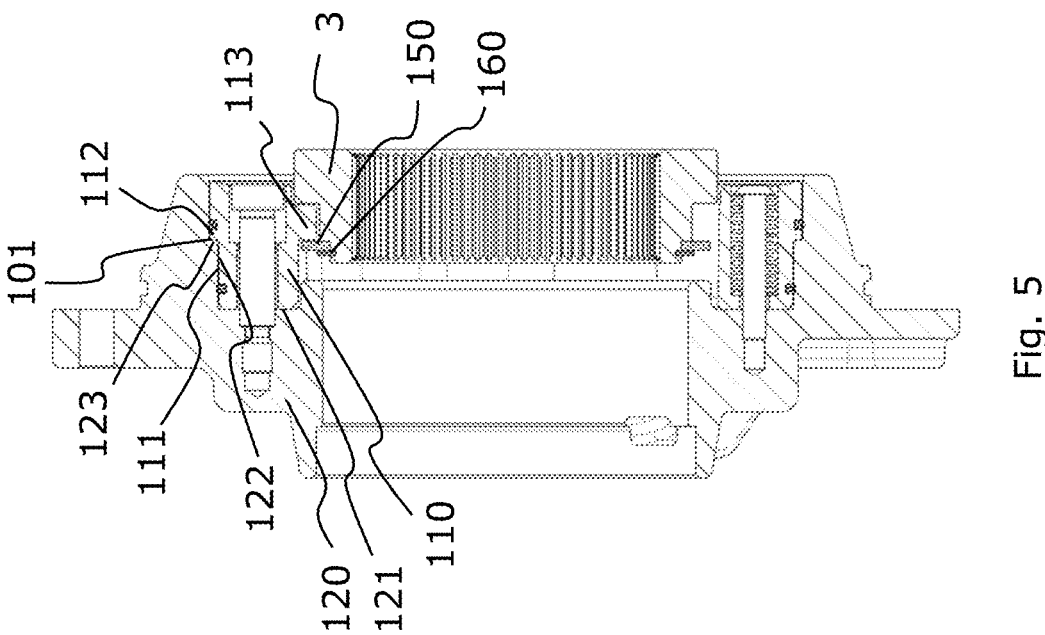

As can be seen most clearly in FIG. 5, the peripheral surface 122 of the piston recess 121 positioned radially outwards comprises a step 123 with a surface facing the axial direction A. The step 123 increases the diameter of the peripheral surface 122 of the piston recess 121 when advancing in the axial direction A from the bottom surface towards an opening of the piston recess 121.

The inner wall portion forming the peripheral surface 122 of the piston recess 121 positioned radially inwards is retracted in the axial direction A with respect to the outer wall portion. That is, the peripheral surface 122 of the piston recess 121 positioned radially inwards does not extend as far in the axial direction as the peripheral surface 122 of the piston recess 121 positioned radially outwards.

The actuator piston 110 is partially accommodated in the piston recess 121 so as to be slidably movable in the axial direction A with respect to the cover 120. The actuator piston 110 is substantially formed as an annular member circumferentially surrounding the shaft 2. One end face in the axial direction is provided so as to come into contact with the bottom surface of the piston recess 121.

An outer peripheral surface 111 of the actuator piston 110 is configured to fit with the peripheral surface 122 of the piston recess 121 positioned radially outwards so as to form a pressure chamber 101 therebetween. The outer peripheral surface 111 of the actuator piston 110 comprises a step 112 increasing the outer diameter of the peripheral surface 111 when advancing from the one end face towards the axial direction A. The step 112 comprises a surface facing in the axial direction A.

When the actuator piston 110 is received in the piston recess 121 of the cover 120, the surface of step 112 is opposed to the surface of step 123 of the peripheral surface 122 of the piston recess 121 positioned radially outwards. Thus, a pressure chamber 101 is formed between the step 112 and the step 123, which can be pressurized and depressurized via an inlet port 124 and a communication path 125 provided in the cover 120. The communication path 125 allows the inlet port 124 to communicate with the pressure chamber 101.

In this embodiment, the pressure chamber 101 is sealed by two seal rings provided on each side of the pressure chamber 101 in the axial direction A between the outer peripheral surface 111 of the actuator piston 110 and the peripheral surface 122 of the piston recess 121 positioned radially outwards. The seal rings are accommodated in respective seal grooves formed in the outer peripheral surface 111 of the actuator piston 110.

Figure 4:
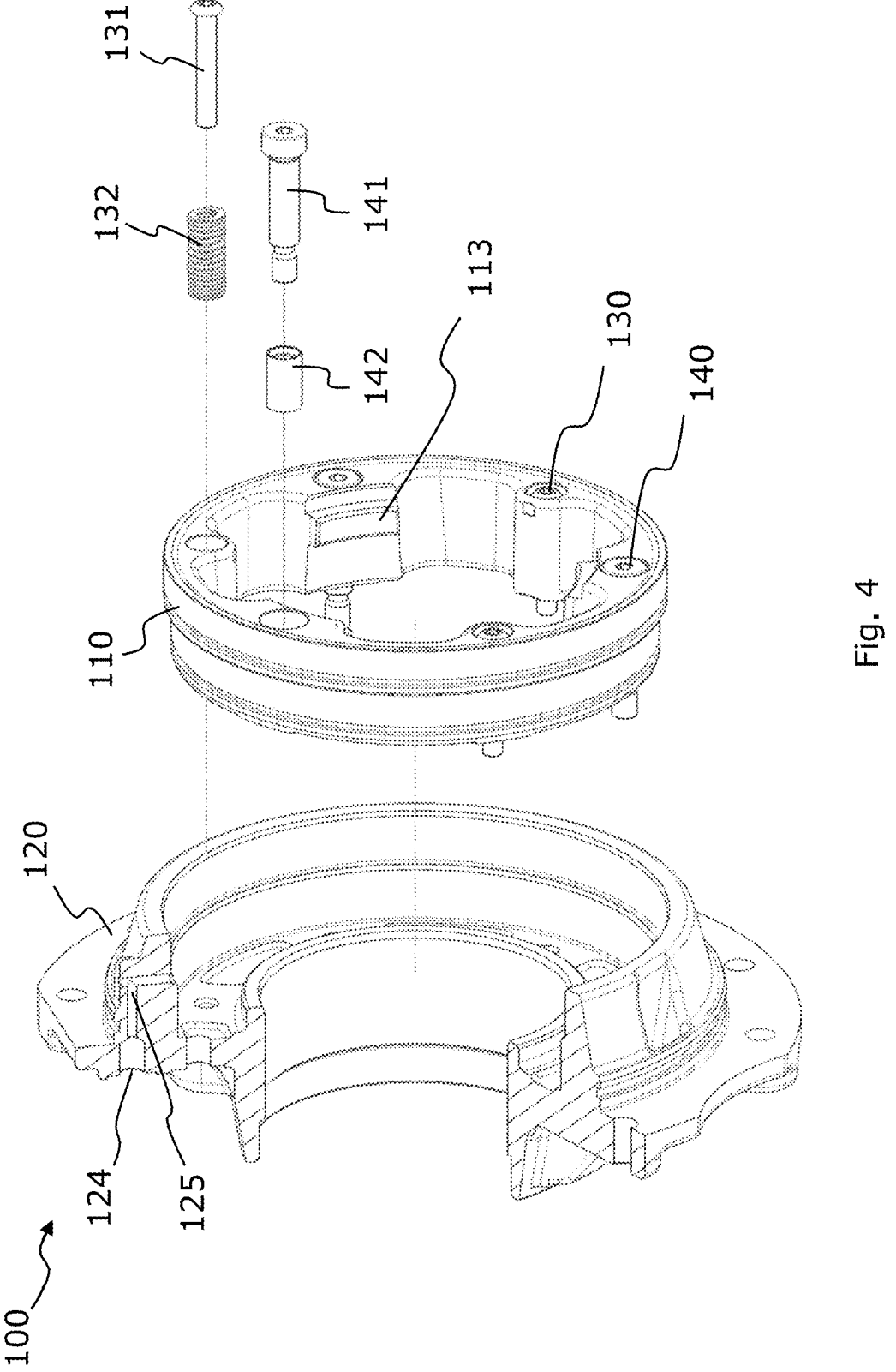
FIG. 4 is an exploded view showing a clutch collar actuator mechanism according to an embodiment of the invention.

On an inner peripheral surface of the actuator piston 110, at least one engaging protrusion is formed which protrudes radially inwardly. In this embodiment, there are a plurality of engaging protrusions in the form of collar teeth 113. In particular, in this embodiment, three collar teeth 113 are formed on the actuator piston 110, which are evenly distributed over the entire circumference so as to be arranged at equal intervals. As shown in FIG. 4, there is one collar tooth 113 every 120°.

The collar teeth 113 are formed such as to overlap in the axial direction A with the second step of the clutch collar 3. Furthermore, the collar teeth 113 overlap in the axial direction A with the spacer ring 150 of the clutch collar 3. Thus, the collar teeth 113 are partially accommodated in the groove formed by the spacer ring 150, the intermediate outer peripheral surface, and the second step of the clutch collar 3.

For assembling the clutch collar actuator mechanism 100 to the clutch collar 3, the collar teeth 113 of the actuator piston 110 can be pushed over the intermediate outer peripheral surface of the clutch collar 3 until the collar teeth 113, in particular a surface of the collar teeth 113 facing the axial direction A, abuts against the second step of the clutch collar 3. The spacer ring 150 is then installed on the clutch collar 3 and secured by the retaining ring 160 so that the clutch collar actuator mechanism 100 is retained on the clutch collar 3.

The actuator piston 110 comprises a plurality of guiding holes penetrating through the actuator piston 110 in the axial direction A. As shown in FIG. 4, in this embodiment, the guiding holes are evenly distributed over the entire circumference so as to be arranged at equal intervals. As an example, the guiding holes are provided at the same positions at which the collar teeth 113 are provided. That is, three guiding holes are provided in the present embodiment. Each guiding hole comprises a small-diameter portion on the axial side facing the cover 120 and a large-diameter portion on the axial side opposite the cover 120.

A guiding member penetrates through each of the guiding holes. As shown most clearly in FIGS. 4 and 5, in this embodiment, the guiding member is a guiding screw 141. The guiding screw 141 comprises a threaded portion, a guiding portion, and a head portion. The threaded portion is screwed to one of the threaded holes provided in the bottom surface of the piston recess 121 of the cover 120. The guiding portion is accommodated in the small-diameter portion of the guiding hole and the head portion is accommodated in the large-diameter portion of the guiding hole.

A diameter of the guiding portion of the guiding screw 141 and a diameter of the small-diameter portion of the guiding hole are adjusted to each other so as to slidably guide an axial movement of the actuator piston 110 with respect to the cover 120. Thus, the guiding screw and the guiding hole form a guiding arrangement 140 for guiding the axial movement of the actuator piston 110 with respect to the cover 120. In order to improve the sliding resistance between the guiding hole and the guiding portion of the guiding screw 141, the guiding arrangement 140 may comprise a suitable sliding sleeve 142 provided in the guiding hole so as to slidably contact the guiding portion of the guiding screw 141.

The actuator piston 110 comprises a plurality of restoring holes penetrating through the actuator piston 110 in the axial direction A. As shown in FIG. 4, in this embodiment, the restoring holes are evenly distributed over the entire circumference so as to be arranged at equal intervals. In particular, the restoring holes are provided at positions between the guiding holes. That is, three restoring holes are provided in the present embodiment. Each restoring hole comprises a small-diameter portion on the axial side facing the cover 120 and a large-diameter portion on the axial side opposite the cover 120.

A preload member penetrates through each of the restoring holes. In this embodiment, the preload member is a preload screw 131. The preload screw 131 comprises a threaded portion, an intermediate portion, and a head portion. The threaded portion is screwed to one of the threaded holes provided in the bottom surface of the piston recess 121 of the cover 120. The intermediate portion is accommodated in the small-diameter portion and the large diameter portion of the restoring hole and the head portion is accommodated in the large-diameter portion of the restoring hole.

An elastic member is interposed between the head portion of the preload screw 131 and a step formed between the small-diameter portion and the large-diameter portion of the restoring hole. In this embodiment, the elastic member is a coil spring 132, but it will be appreciated that any suitable elastic member could be used. When the end face of the actuator piston 110 opposing the cover 120 contacts the bottom surface of the piston recess 121, the spring 132 is in a preload state so as to urge the actuator piston 110 in the axial direction A towards the cover 120. Thus, the restoring hole, the preload screw 131, and the coil spring 132 form a restoring arrangement 130 for applying a restoring force to the actuator piston 110 urging the actuator piston 110 in the axial direction A towards the cover 120.

In the following, operation of the clutch 1 according to the above embodiment is described.

In an initial state, the pressure chamber 101 is not pressurized. Thus, the coil spring 132 of the restoring arrangement 130 urges the actuator piston 110 towards the cover 120 and maintains a retracted position of the actuator piston 110. In the retracted position of the actuator piston 110, the end face of the actuator piston 110 opposing the cover 120 is in contact with the bottom surface of the piston recess 121. The clutch collar 3 engaging with the collar teeth 113 of the actuator piston 110 is in a disengaged state, that is, the clutch collar 3 is retracted from the gear 4 and the set of dog teeth of the clutch collar 3 is not engaged with the set of dog teeth of the gear 4. This state corresponds to a normal operation mode in which the inter-axle differential is not locked.

If there is a demand for locking the inter-axle differential and a corresponding command to lock the inter-axle differential is issued, pressurized fluid is supplied to the inlet port 124 provided in the cover 120. The pressurized fluid is supplied to the pressure chamber 101 via the communication path 125 and the pressure chamber 101 is pressurized. By pressurizing the pressure chamber 101, a force is applied to the actuator piston 110 directed in the axial direction A and acting against the restoring force of the restoring arrangement 130. When the force applied by the pressurized fluid in the pressure chamber 101 exceeds the restoring force, the actuator piston 110 is moved to the extended position in the axial direction A away from the cover 120. In the extended position of the actuator piston 110, the end face of the actuator piston opposing the cover 120 is spaced apart from the bottom surface of the piston recess 121.

When the actuator piston 110 moves to the extended position, the collar teeth abutting against the second step of the clutch collar 3 urge the clutch collar 3 in the axial direction A so as to move towards the gear 4. Thus, the set of dog teeth of the clutch collar 3 engage with the set of dog teeth of the gear 4. As a result, the gear 4 is rotationally fixed to the shaft 2 via the clutch collar 3. This state corresponds to a locked operation mode of the inter-axle differential.

If the demand for locking the inter-axle differential is terminated and/or a corresponding command to unlock the inter-axle differential is issued, the pressure chamber 101 is depressurized via the communication path 125 and the inlet port 124. By depressurizing the pressure chamber 101, the force urging the actuator piston 110 away from the cover 120 is reduced so that the restoring force applied by the restoring arrangement 130 moves the actuator piston 110 back to the retracted position.

When the actuator piston 110 moves back to the retracted position, the collar teeth 113, in particular, a surface of the collar teeth 113 facing the axial direction A, abuts against the spacer ring 150 secured to the clutch collar 3. Thus, the clutch collar 3 is urged in the axial direction A so as to move towards the cover 120 and away from the gear 4. Consequently, the set of dog teeth of the clutch collar 3 are disengaged from the set of dog teeth of the gear 4 and the gear 4 is no longer rotationally fixed to the shaft 2.

Where the word 'or' appears, this is to be construed to mean 'and/or'. This is such that items referred to are not necessarily mutually exclusive and may be used in any appropriate combination.

The invention has been described above with reference to one or more specific embodiments. However, the description is not exhaustive, and the present invention is not limited to the embodiments described. Various changes and modifications can be made without departing from the scope of the invention as defined in the claims. For example:

In the above embodiment, a plurality of collar teeth 113 (i.e., three) are formed on the actuator piston 110. However, the present invention is not limited thereto. It is also possible to form a single collar tooth 113 on the actuator piston 110, which extends in the circumferential direction over the entire circumference.

In the above embodiment, three guiding arrangements 140 are provided. However, the number of guiding arrangements 140 is not limited and may be adapted as appropriate.

In the above embodiment, three restoring arrangements 130 are provided. However, the number of restoring arrangements 130 is not limited and may be adapted as appropriate.

In the above embodiment the clutch 1 assembled to the inter-axle differential has been exemplified. However, the present invention is not limited thereto. The clutch can be implemented to any structure requiring the engagement and disengagement of a clutch collar.

REFERENCE SIGN LIST

1 clutch
100 clutch collar actuator mechanism
101 pressure chamber
110 actuator piston
111 peripheral surface
112 step
113 collar tooth (engaging protrusion)
120 cover
121 piston recess
122 peripheral surface
123 step
124 inlet port
125 communication path
130 restoring arrangement
131 preload screw (preload member)
132 coil spring (elastic member)
140 guiding arrangement
141 guiding screw (guiding member)
142 sliding sleeve
150 spacer ring
160 retaining ring
2 shaft
3 clutch collar
4 gear
A axial direction
R radial direction

What is claimed is:

1. A clutch for a differential lock mechanism comprising:
a clutch collar configured to be disposed on a shaft, the shaft extending in an axial direction and the clutch collar movable along the axial direction; and
a clutch collar actuator mechanism configured to actuate the clutch collar to move along the axial direction, the clutch collar actuator mechanism including:

an actuator piston configured to be disposed around the shaft and to move along the axial direction of the shaft, and wherein the actuator piston is fixed relative to the clutch collar so as to move together with the clutch collar, a restoring arrangement configured to urge the actuator piston from an extended position to a retracted position, and a cover configured to be disposed around the shaft, wherein the restoring arrangement includes a preload member fixed to the cover and an elastic member interposed between the preload member and the actuator piston so as to urge the piston towards the cover.

2. The clutch of claim 1, wherein the clutch collar actuator mechanism includes the cover configured to be disposed around the shaft, the cover partially accommodates the actuator piston in a piston recess, and wherein the cover and the actuator piston form therebetween a pressure chamber configured to be pressurized and depressurized to move the piston back and forth.

3. The clutch of claim 1, wherein the clutch collar actuator mechanism includes a guiding arrangement to guide the movement of the actuator piston in the axial direction.

4. The clutch of claim 3, wherein the clutch collar actuator mechanism includes the cover configured to be disposed around the shaft, wherein the guiding arrangement includes a guiding member fixed to the cover and a guiding hole formed in the actuator piston through which the guiding member penetrates in the axial direction.

5. The clutch of claim 2, wherein the actuator piston circumferentially extends around the axial direction, and the cover circumferentially extends around the axial direction.

6. The clutch of claim 2, wherein the cover includes an inlet port and a communication path for connecting the inlet port and the pressure chamber for supplying pressurized fluid into the pressure chamber.

7. The clutch of claim 1, wherein the clutch collar actuator mechanism includes the cover configured to be disposed around the shaft, the cover defining a piston recess and the actuator piston is disposed in the piston recess, wherein a peripheral surface of the actuator piston comprises a step having a surface facing the axial direction, wherein a peripheral surface of the piston recess facing the peripheral surface of the actuator piston having the step comprises a step having a surface facing the axial direction and opposed to the surface of the step of the actuator piston, and wherein the pressure chamber is interposed between the surface of the step of the actuator piston and the surface of the step of the piston recess.

8. The clutch of claim 1, wherein the actuator piston is disposed around the clutch collar such that the actuator piston and the clutch collar at least partially overlaps in a radial direction.

9. The clutch of claim 2, wherein the cover is disposed around the clutch collar such that the cover and the clutch collar at least partially overlaps in a radial direction.

10. The clutch of claim 1, wherein the actuator piston includes an engaging protrusion engaging with the clutch collar for coupling the actuator piston to the clutch collar.

11. The clutch of claim 10, wherein the engaging protrusion of the actuator piston protrudes from an inner peripheral surface towards a radial inner side.

12. The clutch of claim 10, further comprising:

a plurality of engaging protrusions distributed at equal intervals around a circumference of the actuator piston, wherein the plurality of engaging protrusions includes the engaging protrusion of the actuator piston; and a plurality of guiding arrangements distributed at equal intervals around the circumference of the actuator piston, and wherein positions of the engaging protrusions in a circumferential direction correspond to positions of the guiding arrangements.

13. A differential comprising:

a shaft;

a gear provided on the shaft so as to be rotatable on the shaft; and a differential lock mechanism including the clutch of claim 1, wherein the clutch collar is provided on the shaft so as to be rotationally fixed to the shaft and movable in the axial direction of the shaft, wherein the actuator piston includes an engaging protrusion engaging with the clutch collar for coupling the actuator piston to the clutch collar, and wherein the clutch is configured to selectively engage the clutch collar with the gear so that the gear is rotationally fixed to the shaft, and wherein the clutch includes, a plurality of engaging protrusions distributed at equal intervals around a circumference of the actuator piston, wherein the plurality of engaging protrusions includes the engaging protrusion of the actuator piston; and a plurality of guiding arrangements distributed at equal intervals around the circumference of the actuator piston, and wherein positions of the engaging protrusions in a circumferential direction correspond to positions of the guiding arrangements.

14. A clutch for use in a differential lock mechanism, the clutch comprising:

a clutch collar configured to be disposed on a shaft, the shaft extending in an axial direction and the clutch collar movable in the axial direction along a portion of the shaft; and a clutch collar actuator mechanism configured to actuate the clutch collar to move the clutch collar in the axial direction and along the shaft, the clutch collar actuator mechanism including:

an actuator piston configured to be disposed radially outward from shaft and to move in the axial direction, and wherein the actuator piston is fixed relative to the clutch collar so as to move together with the clutch collar and the actuator piston at least partially overlaps the clutch collar with respect to a radial direction.

15. The clutch of claim 14, wherein the clutch collar actuator mechanism includes a cover configured to be disposed around the shaft, the cover defining a piston recess and the actuator piston disposed in the piston recess, wherein the cover and the actuator piston form a pressure chamber configured to be pressurized and depressurized to move the piston back and forth.

16. The clutch of claim 15, wherein the cover defines an inlet port and a communication path for connecting the inlet port and the pressure chamber for supplying pressurized fluid into the pressure chamber.

17. The clutch of claim 15, wherein the cover at least partially overlaps the clutch collar with respect to the radial direction.

* * * * *